Oct. 13, 1953   A. G. PARTIN   2,655,191
MEAT HOLDING DEVICE
Filed July 27, 1950   2 Sheets-Sheet 1
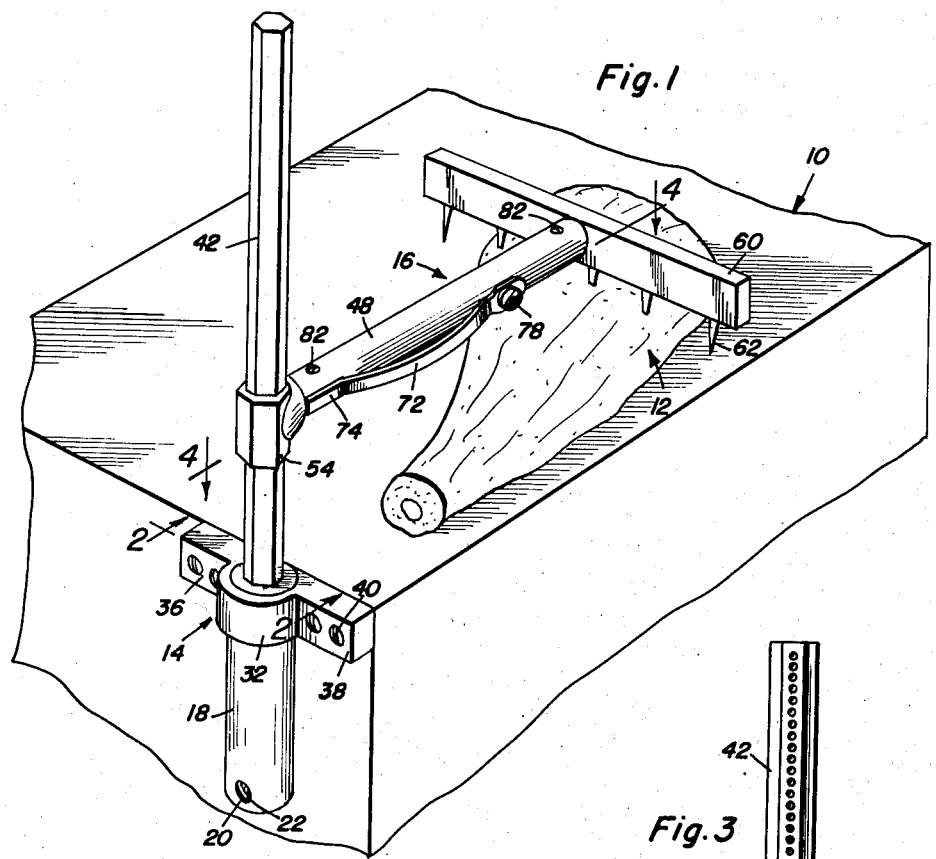
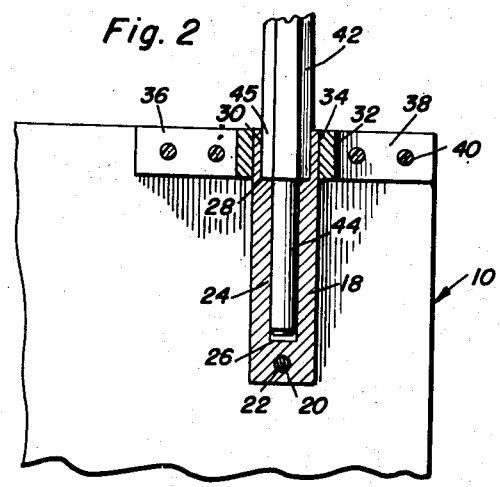
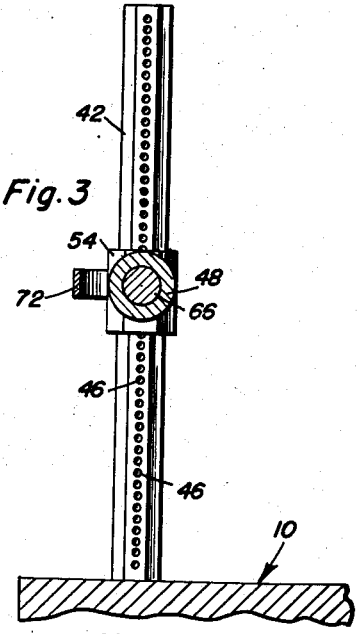
Allen G. Partin
INVENTOR.

Oct. 13, 1953  A. G. PARTIN  2,655,191
MEAT HOLDING DEVICE
Filed July 27, 1950  2 Sheets-Sheet 2
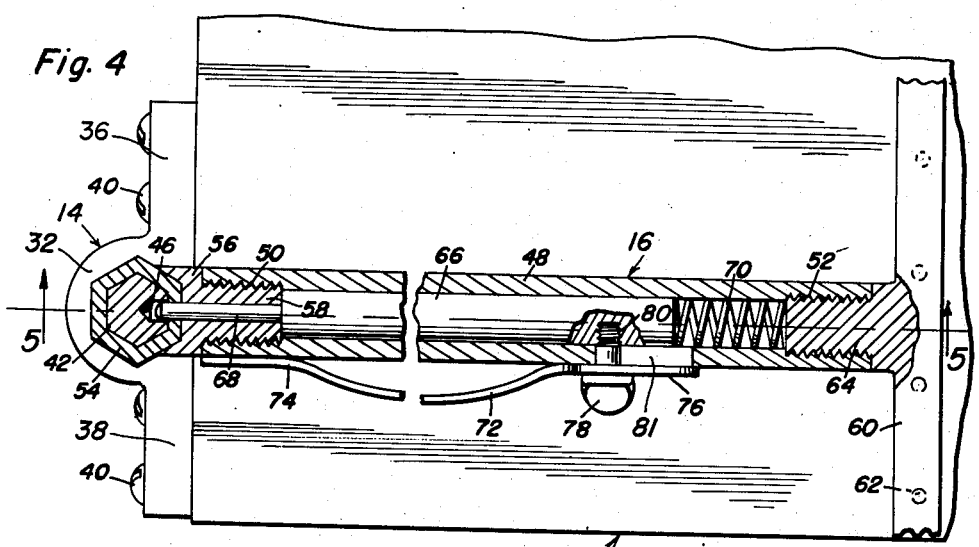
Fig. 4
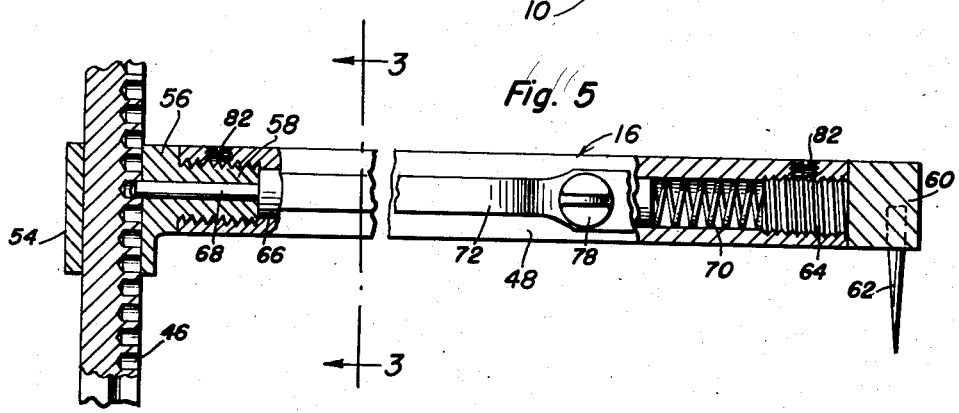
Fig. 5
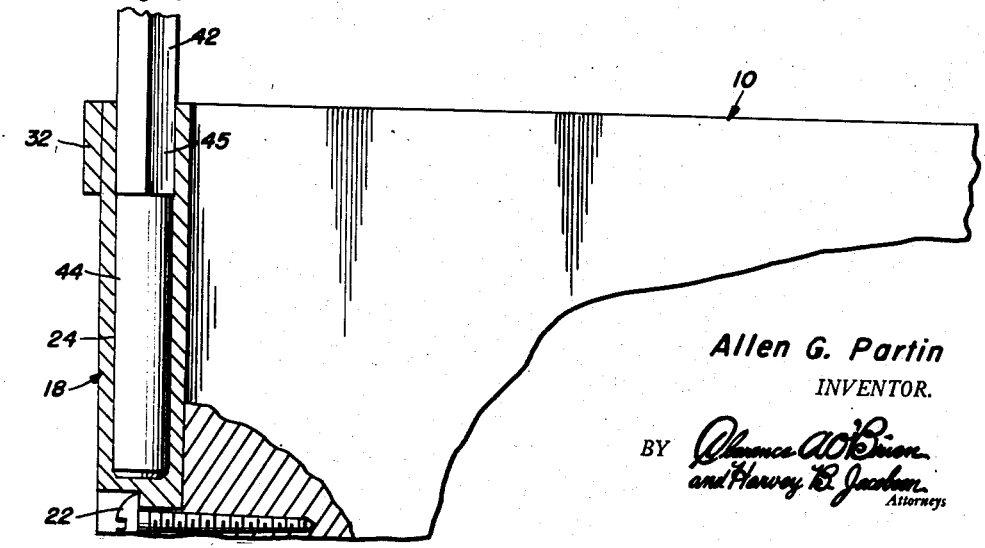
Allen G. Partin
INVENTOR.

Patented Oct. 13, 1953

2,655,191

UNITED STATES PATENT OFFICE 2,655,191

MEAT HOLDING DEVICE

Allen G. Partin, Pontiac, Mich.

Application July 27, 1950, Serial No. 176,229

1 Claim. (Cl. 146—218)

The present invention relates to improvements in gripping devices and more particularly to the type of gripping devices adapted for use as meat holders whereby a piece of meat may be held on a butcher's bench leaving the butcher's hands free for facilitating cutting and boning operations, and the like.

An object of the present invention is to provide a gripping device for holding meat and the like and wherein the gripping means is positioned for vertical sliding movement on a supporting element, with means being provided for adjustably securing the arm in preselected positions on the supporting element.

A further object of the present invention is to provide a novel supporting arrangement for the supporting element whereby the supporting element and arm may be angularly positioned with respect to the supporting means, and wherein means are provided for holding the supporting element from rotation when positioned in a preselected position.

Another object of the present invention is to provide a novel manually operable means on the arm whereby a plunger within the arm may be retracted from engagement with recesses formed on the supporting element for vertically adjusting the arm with respect to a meat supporting surface.

Various other objects and advantages will be apparent from the detailed description to follow. It will be seen that the structure of the present invention is economical of manufacture, relatively simple, easily adjustably positioned, and of relative simplicity.

The best form in which I have contemplated applying my invention is illustrated in the accompanying drawings, wherein:

Figure 1 is a perspective view of the structure of the present invention positioned on a butcher's bench with the gripping means holding a ham;

Figure 2 is a detail vertical sectional view taken substantially along the plane of line 2—2 of Figure 1;

Figure 3 is a vertical transverse sectional view taken substantially along the plane of line 3—3 of Figure 5;

Figure 4 is a horizontal longitudinal sectional view taken substantially along the plane of line 4—4 of Figure 1; and Figure 5 is a vertical longitudinal sectional view taken substantially along the plane of line 5—5 of Figure 4, with parts not in section.

Referring more particularly to the drawing, wherein like numerals designate like parts throughout, the numeral 10 designates generally a butcher's bench or the like upon which the piece to be gripped may be supported, the piece here shown being a ham 12. The gripping device of the present invention includes a supporting element and means for securing the supporting element in upstanding relation to the butcher's bench 10, designated generally as 14, and the adjustably positioned arm and prong-holding bar designated generally as 16.

The means for supporting the structure of the present invention on the butcher's bench 10 includes a sleeve or socket 18 which is provided with an aperture 20 at its lower end through which is inserted a screw 22 for securing the lower end of the sleeve 18 to the bench 10. The sleeve 18 is provided with a longitudinally extending bore 24 terminating in an end wall 26 at its lower end. The upper end of the bore 24 is enlarged at 28 and is formed to a non-circular cross-section at 30. The sleeve 18 has its upper end secured for movement with respect to the bench 10 by means of the bracket 32 having a bore 34 therein for receiving the upper end of the sleeve 18, and wherein the bracket is formed with oppositely extending flanges 36 and 38 which are apertured for receiving screws 40 for securing the bracket to the bench 10.

A supporting element or post 42 is provided at its lower end with a substantially circular cross-section pilot or guide portion 44 which is adapted to be rotatably received within the bore 24 of the sleeve 18. The supporting element 42 is of enlarged cross-section over a greater length of its portion and is of non-circular form, here shown to be hexagonal. It will be noted that the lower end portion of the non-circular end 44 of the supporting element 42 is receivable in the non-circular portion 30 in the sleeve 18, whereby rotation of the supporting element 42 with respect to the sleeve 18 is prevented. If it is desired that the supporting element 42 be rotated with respect to the sleeve 18, the supporting element is lifted until the entire non-circular end 44 is without the recess 30, thereby permitting rotation of the supporting element 42 until the desired relationship is accomplished, whereupon the supporting element 42 may be dropped with the non-circular portions cooperating to maintain the supporting element 42 from further displacement.

The supporting element 42 is provided throughout a major portion of its length with a plurality of recesses 46 whereby positioning of the arm and gripping means 16 with respect to the supporting element may be accomplished.

The arm and gripping means 16 which is of tubular form and is internally threaded at each of its end portions 50 and 52. A non-circular sleeve 54 which has an internal cross-sectional area substantially equal to the cross-sectional area of the supporting element 42 has integrally formed therewith the arm engaging plug 56 which has an externally threaded portion 58 adapted to be threadably positioned within the tubular arm 48. A flat bar 60 is provided with a plurality of downwardly extending prongs 62 which may be secured to the bar 60 by any desired means, such as press fitting or welding. The bar 60 is provided with a laterally extending, externally threaded boss 64 which is adapted to be threadably received within the threaded bore 52 of the tubular arm 48.

A plunger 66 is slidably received within the tubular arm 48 and has integrally formed therewith an axially extending reduced diameter finger 68 which is adapted to be selectively positioned in a preselected one of the recesses 46. A resilient coiled spring 70 is positioned between the plunger 66 and the boss 64 for normally holding the plunger 66 in extended position with the finger 68 engaged in one of the recesses 46 of the supporting element 42.

A means is provided for manually retracting the plunger 66 from its extended position and this means includes a spring strap 72 which is fixedly secured to the exterior of the arm 48 at 74, by weld or other conventional means. The opposite end of the spring strap 72 is apertured and the shank portion of the thumb screw 78 is receivable therein. The threaded portion of the thumb screw 78 is threadably received within a threaded recess in the plunger 66 at 80. The thumb screw 78 is operable in a longitudinal slot 81 which is provided therefor in the tubular arm 48.

Means are also provided for securing the tubular arm 48 from rotation with respect to the externally threaded end 58 and for preventing rotation of the gripping bar 60 with respect to the arm 48. This last-mentioned means includes a pair of set screws 82 which are threadably engaged in the arm 48 and are adapted to engage the externally threaded portions 58 and 64.

From the foregoing description taken in conjunction with the drawings, it is believed that the functioning of the gripping device of the present invention will be readily apparent to one skilled in the art. The supporting element 42 may be placed in a preselected position whereby the recesses 46 face a preselected position on the bench 10. The arm and gripping means of the present invention may then be released from their position on the supporting element 42 by depressing the spring strap 72, thereby releasing the finger 68 from its respective recess, and downward movement of the arm and gripping means may be effected until the prongs of the bar 60 are engaged in the piece of meat. The spring strap 72 may then be released, permitting the finger 68 to engage a juxtaposed recess, thereby holding the arm and gripping means in a "down" position. The butcher may now have both of his hands free in order that he perform operations such as boning hams and the like.

It should be noted that the structure of the present invention need not be used in the exact manner as shown in Figure 1, but the bar 60 and prongs 62 may be rotated through 180° in order that the prongs will be upstanding. This would be particularly effective for removing the hide from slab bacon. The slab of bacon could be pressed onto the prongs 62 and the bacon will be held thereby while the hide is removed.

It is believed that one skilled in the art will readily see many other uses for the structure of the present invention, and I do not wish to be limited by the uses hereinabove set forth.

Having thus described the invention, what is claimed as new is:

A meat holding device comprising a post having a series of sockets, a tubular arm mounted for vertical sliding adjustment on said post and having a longitudinal slot, a gripping member on the free end of the arm, a spring projected bolt slidable in the arm and engageable selectively in the sockets for releasably securing the arm in adjusted position, said bolt having a threaded recess therein, a bowed spring mounted longitudinally on the arm and having one end portion fixed thereto at a point adjacent the post, said spring including a flattened, apertured outer end portion slidably engaged with the slotted portion of the arm, and a thumb screw on said flattened end portion of the spring operable in the slot and threadedly engaged in the recess and operatively connecting the spring to the bolt for retracting said bolt when said spring is flattened against the arm.

ALLEN G. PARTIN.

References Cited in the file of this patent

UNITED STATES PATENTS

| Number | Name | Date |
|---|---|---|
| 1,006,928 | Frazier | Oct. 24, 1911 |
| 1,999,809 | Gloekler | Apr. 30, 1935 |
| 2,533,308 | Betten et al. | Dec. 12, 1950 |
| 2,545,699 | Johannsen | Mar. 20, 1951 |

FOREIGN PATENTS

| Number | Country | Date |
|---|---|---|
| 31,576 | Denmark | Apr. 10, 1923 |
| 36,621 | Denmark | Sept. 21, 1926 |